US012685985B2

(12) United States Patent
Qiu

(10) Patent No.: US 12,685,985 B2
(45) Date of Patent: Jul. 21, 2026

(54) NANOPARTICLE TEMPLATES AND METHODS OF USE FOR MAKING HOLLOW NANOPARTICLES

(71) Applicant: The Board of Regents of the University of Oklahoma, Norman, OK (US)

(72) Inventor: Penghe Qiu, Norman, OK (US)

(73) Assignee: THE BOARD OF REGENTS OF THE UNIVERSITY OF OKLAHOMA, Norman, OK (US)

( * ) Notice: Subject to any disclaimer, the term of this patent is extended or adjusted under 35 U.S.C. 154(b) by 492 days.

(21) Appl. No.: 18/139,586

(22) Filed: Apr. 26, 2023

(65) Prior Publication Data

US 2023/0381732 A1     Nov. 30, 2023

Related U.S. Application Data

(60) Provisional application No. 63/335,578, filed on Apr. 27, 2022.

(51) Int. Cl.
| | |
|---|---|
| *B01J 13/20* | (2006.01) |
| *B01J 13/10* | (2006.01) |
| *B82Y 30/00* | (2011.01) |
| *B82Y 40/00* | (2011.01) |
| *C01B 33/18* | (2006.01) |
| *C01D 7/06* | (2006.01) |

(52) U.S. Cl.
CPC ............ *B01J 13/203* (2013.01); *B01J 13/10* (2013.01); *C01B 33/18* (2013.01); *C01D 7/06* (2013.01); *B82Y 30/00* (2013.01); *B82Y 40/00* (2013.01); *C01P 2004/64* (2013.01)

(58) Field of Classification Search
None
See application file for complete search history.

(56) References Cited

U.S. PATENT DOCUMENTS

| | | | |
|---|---|---|---|
| 8,945,504 | B2 | 2/2015 | Archer et al. |
| 9,276,063 | B2 | 3/2016 | Zhang et al. |
| 9,555,557 | B2 | 1/2017 | Yan et al. |
| 10,328,160 | B2 | 6/2019 | Trogler et al. |
| 10,729,783 | B2 | 8/2020 | Mou et al. |
| 11,045,427 | B2 | 6/2021 | John et al. |
| 12,017,917 | B2 | 6/2024 | Yu et al. |
| 2021/0032099 | A1 | 2/2021 | Xia et al. |
| 2023/0381732 | A1 | 11/2023 | Qiu |

FOREIGN PATENT DOCUMENTS

| | | |
|---|---|---|
| WO | 2008028640 A2 | 3/2008 |
| WO | 2009088250 A2 | 7/2009 |

*Primary Examiner* — Jeffrey D Washville
(74) *Attorney, Agent, or Firm* — WINSTEAD PC

(57) ABSTRACT

Methods of forming hollow nanoparticles, methods of making templates for use in forming hollow nanoparticles, templates made by such methods, and hollow nanoparticles formed by such methods and templates.

11 Claims, 6 Drawing Sheets

NANOPARTICLE TEMPLATES AND METHODS OF USE FOR MAKING HOLLOW NANOPARTICLES

CROSS-REFERENCE TO RELATED APPLICATIONS

This patent application claims priority from, and incorporates by reference the entire disclosure of, U.S. Provisional Application 63/335,578 filed on Apr. 27, 2022.

TECHNICAL FIELD

The present disclosure relates generally to hollow nanoparticles and more particularly, but not by way of limitation, to nanoparticle templates and methods of use for making hollow nanoparticles.

BACKGROUND

The control of shape and/or structure has been a key focus in the synthetic chemistry of nanoparticles, due to the fact that various physical and chemical properties of nanomaterials are strongly dependent on their morphology. Hollow nanoparticles are an important category of nanomaterials that have been demonstrated in a number of applications as enabled by their unique hollow structures. For example, as anti-reflective coatings, fuel storage, silicon-anode for lithium ion batteries, MRI contrast probes, thermal insulation, and solid electrolytes for batteries. Hollow nanoparticles can be fabricated through two major approaches, namely templated and non-templated approaches. In the templated approach, hollow structures are formed around the surface of a pre-formed nano-sized object, which could be micelles, oil nanodroplets, polymer nanoparticles, inorganic nanoparticles, as well as virus nanoparticles. Upon removal of these templates in the core through dissolution or calcination, hollow nanoparticles of a pure chemical composition can be obtained. The non-templated approach is achieved through chemical etching or Ostwald ripening of solid nanoparticles with overall homogeneous chemical composition. In addition to these two major approaches, hollow nanostructures can also be directly obtained as the final product through a wet chemical synthesis. However, these are only reported as individual examples for a specific material, and thus lack of generality.

Despite the numerous research articles about the preparation and potential applications of hollow nanoparticles, their large-scale practical applications have been hindered by the lack of an approach that can cost-effectively mass produce these hollow nanoparticles. For example, many biological and optical coating applications demand the hollow nanoparticles have diameters less than 100 nm, have shell thicknesses of a few nm, and be dispersed stably and individually in the solution phase. However, for the most adopted polymer nanoparticles templated approach, the polymer core can only be removed thoroughly through calcination, during which the hollow nanoparticles undergo irreversible aggregation and lose their dispersity in the solution phase. Hollow nanoparticles fabricated with soft templates, like micelles and oil droplets, generally do not have much flexibility in size and thickness control that can meet the requirements for biological and optical coating applications. Furthermore, for most of the above approaches, the yield of hollow nanoparticles is very low, which makes them not cost-effective for scaled production.

Development of a suitable salt template, that is small enough, stable enough, and can be produced at scale, is of key importance to the success of this approach. Up to date, two types of simple salt nanoparticles have been demonstrated as templates for the synthesis of hollow silica nanoparticles, namely calcium carbonate and sodium citrate. However, the quality of these salt nanoparticles templates still does not meet demands for optical coating or biomedical applications. The calcium carbonate nanoparticles are irregularly crystallized and are not individually dispersed, but in aggregates of a few nanoparticles, therefore, the resultant hollow nanoparticles are not uniform in shape and widely distributed in size. For example, hollow nanoparticles templated against sodium citrate are generally too large (over 150 nm in diameter) and too thick (over 15 nm shell thickness) for optical applications.

DETAILED DESCRIPTION

Figure 1:
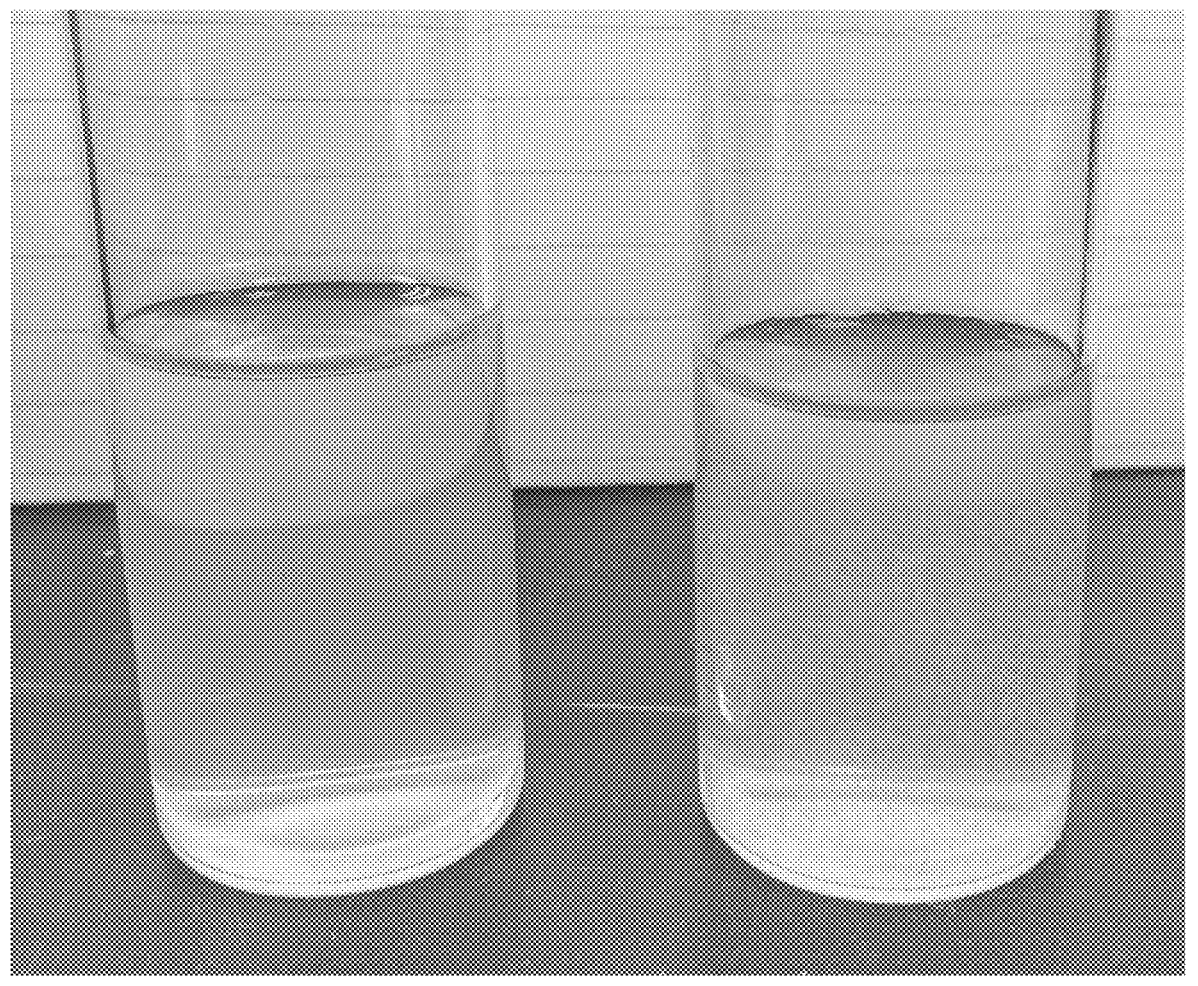
FIG. 1 shows preparations of sodium carbonate particles through precipitation in ethanol. Left: addition of 0.5 ml of 0.12 M aqueous sodium carbonate solution to a mixed solution of diethanolamine (2 ml) and absolute ethanol (10 ml) under vigorous stirring resulted in a slightly cloudy solution, indicating formation of stable nanosized particles. Right: in pure ethanol without alkanolamines, no stable dispersion can be obtained, instead, the salt formed bulky precipitates and sedimented very quickly. White particles in the solution are flocculated salt particles.
Figure 2:
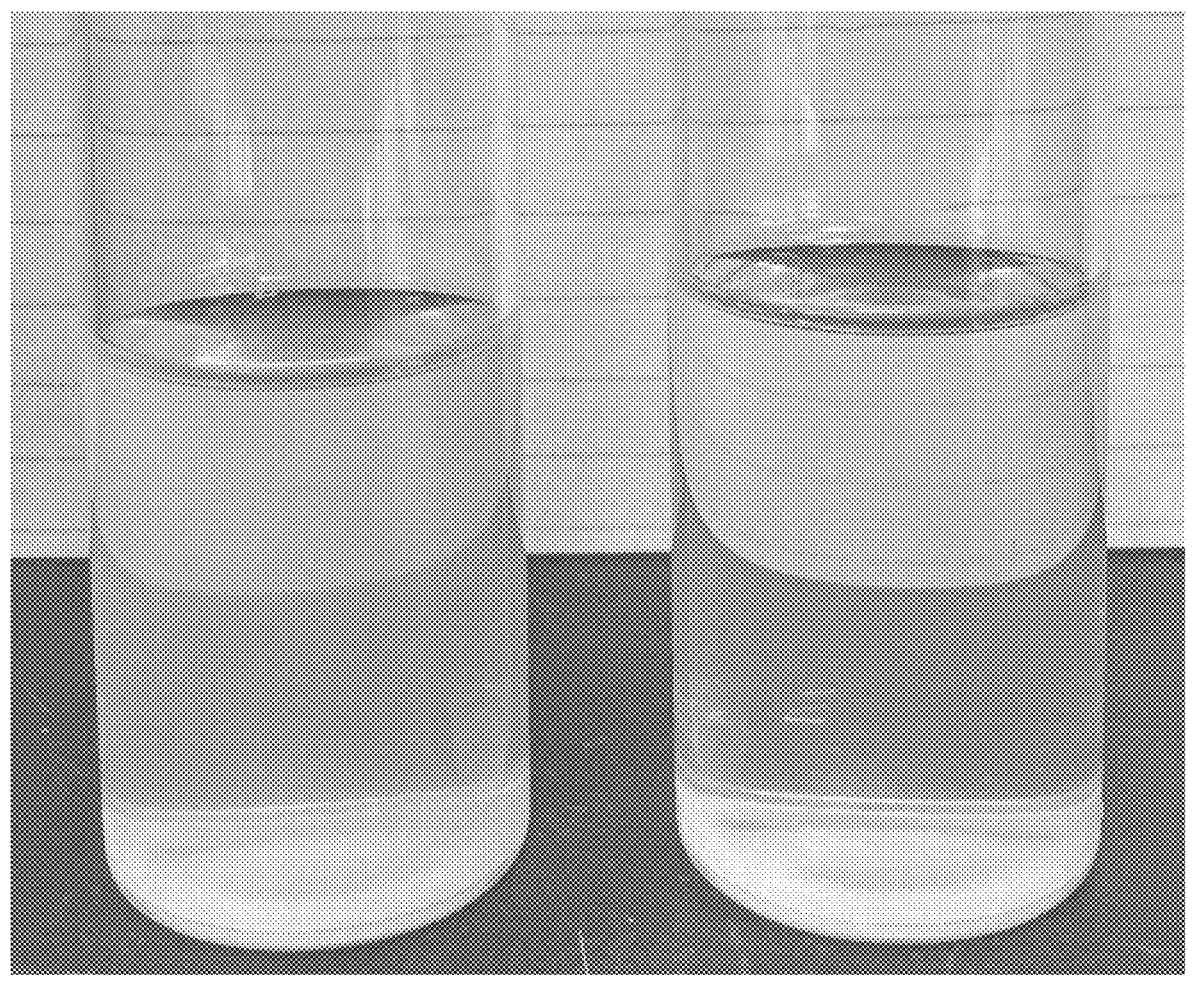
FIG. 2 shows the impact of alkanolamine concentration on the size of sodium carbonate salt nanoparticles. Left: salt nanoparticles dispersion obtained through addition of 0.5 ml of 0.12 M aqueous sodium carbonate solution to a mixed solution of diethanolamine (1 ml) and absolute ethanol (10 ml) under vigorous stirring; Right: salt nanoparticles dispersion obtained through addition of 0.5 ml of 0.12 M aqueous sodium carbonate solution to a mixed solution of diethanolamine (2 ml) and absolute ethanol (10 ml) under vigorous stirring. The less cloudy solution on the right indicates that increasing the amount of alkanolamines will further reduce the salt nanoparticles size.
Figure 3:
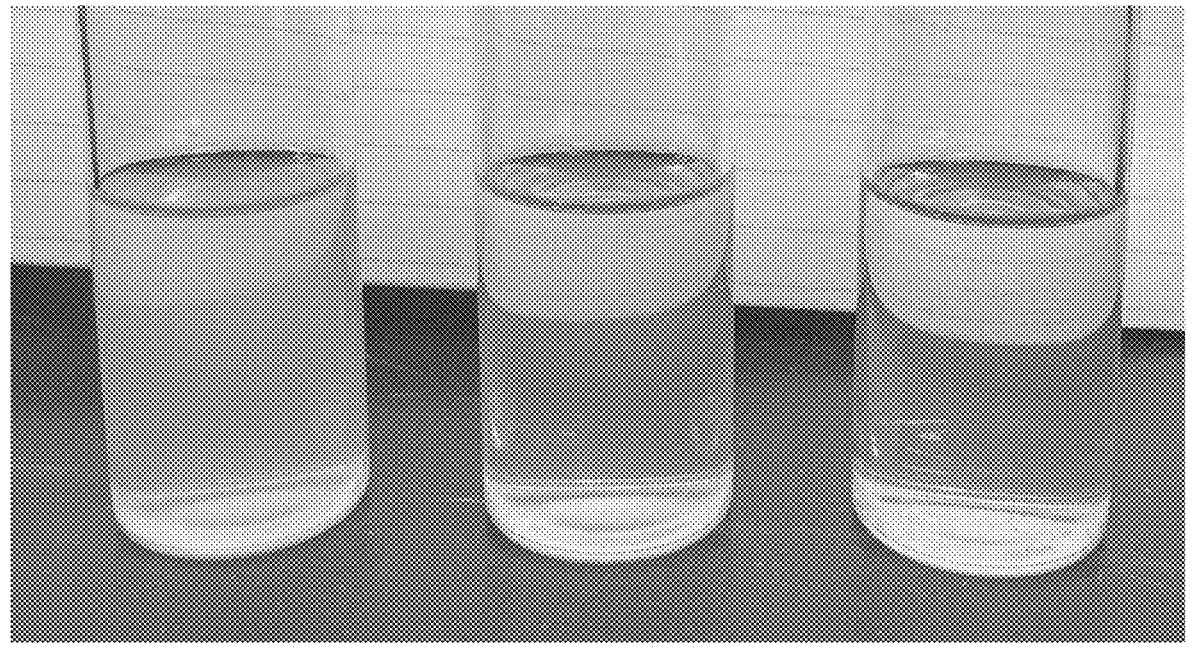
FIG. 3 shows the correlation of salt concentration on the size of the resultant salt nanoparticles. From left to right: salt nanoparticles dispersions obtained through addition of 0.5 ml of 0.18 M, 0.12 M, and 0.06 M aqueous sodium carbonate solutions, respectively, to a mixed solution of diethanolamine (2 ml) and absolute ethanol (10 ml) under vigorous stirring. The significantly decreased solution cloudiness from left to right indicates that smaller salt nanoparticles are formed under reduced salt concentrations.

The present disclosure is directed to using solution-dispersed salt nanoparticles (such as but not limited to widely available s-block metal salts such as sodium chloride, sodium carbonate, sodium sulfate, and calcium carbonate, and other non-limiting examples described below) as templates for the fabrication of hollow nanoparticles. The salt core can then be dissolved in water or diluted acid, without leaving any residues in the hollow nanostructures. However, preparation of stable dispersion of salt nanoparticles has been a challenge, due to the inherent instability of the salt nanoparticles that can easily lead to nanoparticles aggregation and formation of micron-scale crystals.

The present disclosure solves the stability challenge by introducing alkanolamines as ligands to obtain stable and size-controllable salt nano templates. The conventional ligand theory is developed almost exclusively for nanoparticles of transition metals and their compounds. Due to the rich coordination chemistry of the d-block elements, ligands that have strong metal-ligand coordinate covalent bonding, such as —SH, —COOH, —NH$_2$, are selected to stabilize the nanoparticles. However, the s-block metals have very poor coordination chemistry, thus, their nanoparticles cannot be stabilized in the same way. Instead, the alkanolamine ligands developed in this disclosure functions through the anion-ligand interaction: the amine group on alkanolamines will bind to the anions of the s-block metal salt nanoparticles through electrostatic interaction and the hydroxyl group on the molecules will extend into the alcoholic solvent to achieve nanoparticle stabilization. It has been discovered herein that introduction of alkanolamines not only stabilize the salt nanoparticles in the solution phase, but also significantly reduce the size of nanoparticles as well as increase the stable concentration range of salt nanoparticles. This discovery enables the production of hollow nanoparticles, for example, hollow silica nanoparticles, in large scale.

In at least one embodiment, the present disclosure is directed to a method for making a template for use in forming hollow nanoparticles. In general, the method includes providing an aqueous solution having a salt, providing a solvent solution composed of a solvent and an alkanolamine, combining the aqueous solution with the solvent solution forming a solvent mixture, where the solvent mixture includes salt core nanoparticles formed from precipitation of the salt, adding a precursor compound to the solvent mixture, where the precursor compound undergoes a reaction to form insoluble outer shells over the salt core nanoparticles, and forming core/shell nanoparticles.

In an additional embodiment, the present disclosure is directed to a method of forming hollow nanoparticles. In general, the method includes providing an aqueous solution having a salt, providing a solvent solution composed of a solvent and an alkanolamine, combining the aqueous solution with the solvent solution forming a solvent mixture, where the solvent mixture includes salt core nanoparticles formed from precipitation of the salt, adding a precursor compound to the solvent mixture to form insoluble outer shells over the salt core nanoparticles, forming core/shell nanoparticles, and producing the hollow nanoparticles by exposing the core/shell nanoparticles to a salt-dissolving solvent thereby causing dissolution of salt cores of the core/shell nanoparticles.

Before further describing various embodiments of the present disclosure in more detail by way of exemplary description, examples, and results, it is to be understood that the compounds, compositions, and methods of present disclosure are not limited in application to the details of specific embodiments and examples as set forth in the following description. The description provided herein is intended for purposes of illustration only and is not intended to be construed in a limiting sense. As such, the language used herein is intended to be given the broadest possible scope and meaning, and the embodiments and examples are meant to be exemplary, not exhaustive. Also, it is to be understood that the phraseology and terminology employed herein is for the purpose of description only and should not be regarded as limiting unless otherwise indicated as so. Moreover, in the following detailed description, numerous specific details are set forth in order to provide a more thorough understanding of the present disclosure. However, it will be apparent to a person having ordinary skill in the art that the present disclosure may be practiced without these specific details. In other instances, features which are well known to persons of ordinary skill in the art have not been described in detail to avoid unnecessary complication of the description. It is intended that all alternatives, substitutions, modifications, and equivalents apparent to those having ordinary skill in the art are included within the scope of the present disclosure. Thus, while the compounds, compositions, and methods of the present disclosure have been described in terms of particular embodiments, it will be apparent to those of skill in the art that variations may be applied to the compounds, compositions, and methods and in the steps or in the sequence of steps of the methods described herein without departing from the concept, spirit, and scope of the inventive concepts.

All patents, published patent applications, and non-patent publications including published articles mentioned in the specification or referenced in any portion of this application are herein expressly incorporated by reference in their entirety to the same extent as if each individual patent or publication was specifically and individually indicated to be incorporated by reference.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular. Where used herein, the specific term "single" is limited to only "one."

As utilized in accordance with the methods, compounds, and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. Reference to an integer with more (greater) or less than includes any number greater or less than the reference number, respectively. Thus, for example, reference to less than 100 includes 99, 98, 97, etc. all the way down to the number one (1); and less than 10 includes 9, 8, 7, etc. all the way down to the number one (1).

As used in this specification and claims, the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error for the composition, the method used to administer the composition, or the variation that exists among the study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The terms "about" or "approximately," where used herein when referring to a measurable value such as an amount, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment and may be included in other embodiments. The appearances of the phrase "in one embodiment" in various places in the specification are not necessarily all referring to the same embodiment and are not necessarily limited to a single or particular embodiment. Further, all references to one or more embodiments or examples are to be construed as non-limiting to the claims.

As used herein, "pure" or "substantially pure" means an object species is the predominant species present (i.e., on a molar basis it is more abundant than any other object species in the composition thereof), and particularly a substantially purified fraction is a composition wherein the object species comprises at least about 50 percent (on a molar basis) of all macromolecular species present. Generally, a substantially pure composition will comprise more than about 80% of all macromolecular species present in the composition, more particularly more than about 85%, more than about 90%, more than about 95%, or more than about 99%. The term "pure" or "substantially pure" also refers to preparations where the object species is at least 60% (w/w) pure, or at least 70% (w/w) pure, or at least 75% (w/w) pure, or at least 80% (w/w) pure, or at least 85% (w/w) pure, or at least 90% (w/w) pure, or at least 92% (w/w) pure, or at least 95% (w/w) pure, or at least 96% (w/w) pure, or at least 97% (w/w) pure, or at least 98% (w/w) pure, or at least 99% (w/w) pure, or 100% (w/w) pure.

The term "nanoparticle," as used herein, generally refers to a particle having a diameter, such as an average diameter, from about 1 nm, to about 5 nm, to about 10 nm, to about 50 nm up to about 1000 nm, including, for example, particles having an average diameter of 5 nm, to 10 nm, to 20 nm, to 30 nm, to 40 nm, to 50 nm, to 60 nm, to 70 nm, to 80 nm, to 90 nm, to 100 nm, to 110 nm, to 120 nm, to 130 nm, to 140 nm, to 150 nm, up to about 200 nm, up to about 250 nm, up to about 300 nm, up to about 400 nm, up to about 500 nm, up to about 600 nm, up to about 700 nm, up to about 800 nm, or up to about 900 nm or more. The particles can have any shape. Nanoparticles having a spherical shape may be referred to as "nanospheres." When used in reference to a hollow nanoparticle (i.e., a nanoparticle having empty space within the particle), the term "diameter" refers to the external diameter of the nanoparticle. In the present disclosure, hollow nanoparticles are produced by removing the internal salt core from the precursor nanoparticle template, for example by dissolution of the salt core, which leaves the hollow nanoparticle.

Where used herein, the term "alkyl" refers to a straight or branched hydrocarbon group having 1, 2, 3, 4, 5, 6, 7, 8, 9, 10, 11, 12, 13, 14, 15, 16, 17, 18, 19, 20, 21, 22, 23, 24, 25, or 26 carbon atoms, for example 1-18 carbon atoms, 1-12 carbon atoms, 1-8 carbon atoms, or 1-4 carbon atoms, and includes, but is not limited to, methyl, ethyl, n-propyl, isopropyl, n-butyl, sec-butyl, isobutyl, tert-butyl, n-pentyl, n-hexyl, n-heptyl, n-octyl, n-nonyl, n-decyl, n-dodecyl, 2-ethylhexyl, fluoromethyl, fluorochloromethyl, and trifluoromethyl. Alkyl groups may be optionally substituted with one or more substituents, such as halogens, where halogen (or "halo") refers to fluoro (fluorine, "F"), chloro (chlorine, "Cl"), bromo (bromine, "Br"), and iodo (iodine, "I"), nitro, cyano, amido, amino, sulfonyl, sulfinyl, sulfanyl, sulfoxy, urea, thiourea, sulfamoyl, sulfamide and hydroxy. The term "branched" should be understood to represent a linear straight chain hydrocarbon group having one or more lower alkyl groups such as methyl, ethyl or propyl, attached to it. The term "alkoxy" refers to a functional group containing an alkyl group (R) bonded to an oxygen atom (O) and having the general formula "R—O." The term alkoxy is also known as an "alkyloxy" group. The term "alkenyl" refers to an alkyl group containing at least one carbon-carbon double bond. Alkenyl groups may be optionally substituted with one or more substituents. The term "alkynyl" refers to an alkyl group containing at least one carbon-carbon triple bond. Alkynyl groups may be optionally substituted with one or more substituents. The term "hydroxypropyl" refers to three-carbon groups comprising one hydroxyl group and includes, but is not limited to, 2-hydroxypropyl and 1-hydroxypropan-2-yl. The term "dihydroxypropyl" refers to three-carbon groups comprising two hydroxyl groups and includes, but is not limited to, 1,3-dihydroxypropan-2-yl and 2,3-dihydroxypropyl.

The term "alkoxysilane" as used herein refers to a compound having an alkoxy group as a substituent of a silicon atom. The substituent of the silicon atom may be an alkyl group as described above, or an aromatic hydrocarbon group, e.g., having 6 to 10 carbon atoms other than the alkoxy group. In addition, the hydrogen atoms of the alkyl group may be substituted with a halogen atom, a vinyl group, a glycidyl group, a mercapto group, an amino group, or other groups as indicated herein.

In a non-limiting embodiment, the alkoxysilane may be a tetrafunctional alkoxysilane having only an alkoxy group as a substituent of silicon atom include tetramethoxysilane, tetraethoxysilane, tetraisopropoxysilane, tetrabutoxysilane, and dimethoxydiethoxysilane. In addition, examples of the alkoxysilane having an alkoxy group and an unsubstituted alkyl group as a substituent of silicon atom include trifunctional alkoxysilanes such as methyltrimethoxysilane and methyltriethoxysilane; difunctional alkoxysilanes such as dimethyldimethoxysilane and dimethyldiethoxysilane; and monofunctional alkoxysilanes such as trimethylmethoxysilane and trimethylethoxysilane. Furthermore, examples of the alkoxysilane having an alkoxy group and a substituted alkyl group as a substituent of silicon atom include chloroalkyl group-containing alkoxysilanes such as 3-chloropropylmethyldimethoxysilane and 3-chloropropyltrimethoxysilane; vinyl group-containing alkoxysilanes such as vinyltrimethoxysilane and vinyltriethoxysilane; aromatic group-containing alkoxysilanes such as phenyltrimethoxysilane, phenyltriethoxysilane, diphenyldimethoxysilane, and diphenyldiethoxysilane; glycidyl group-containing alkoxysilanes such as 3-glycidoxypropyltrimethoxysilane, 3-glycidoxypropylmethyldimethoxysilane, and 3-glycidoxypropylmethyldiethoxysilane; mercapto group-containing alkoxysilanes such as 3-mercaptopropyltrimethoxysilane;

and amino group-containing alkoxysilanes such as 3-aminopropyltrimethoxysilane and 3-(2-aminoethylamino)propyltrimethoxysilane.

Certain of the disclosed compounds may exist in various stereoisomeric forms. Stereoisomers are compounds that differ only in their spatial arrangement. Enantiomers are pairs of stereoisomers that are non-superimposable mirror images of one another, most commonly because they contain an asymmetrically substituted carbon atom that acts as a chiral center. "Enantiomer" means one of a pair of molecules that are mirror images of each other and are not superimposable. Diastereomers are stereoisomers that are not related as mirror images, most commonly because they contain two or more asymmetrically substituted carbon atoms. The symbol "*" in a structural formula represents the presence of a chiral carbon center. "R" and "S" represent the configuration of substituents around one or more chiral carbon atoms. Thus, "R*" and "S*" denote the relative configurations of substituents around one or more chiral carbon atoms.

Conventionally, preparation of simple salt nanoparticles is achieved through precipitation. A precursor may be, for example, an inorganic compound A that is soluble in water and a solvent B which is miscible with water, but in which compound A is significantly less soluble, such as alcohols. When the aqueous solution of compound A is mixed with solvent B, the compound will precipitate out of solution as a result of reduced solubility. Depending on the types of compounds, the concentration and the solvent, the precipitation can be in the form of nanoparticles, microparticles, or bulk flocculates. In general, precipitates obtained by this approach are not uniform in shape and do not remain as a stable dispersion for long periods.

In the presently disclosed methods, alkanolamines are introduced as ligands to stabilize the nanoparticles produced through the above precipitation approach. In a non-limiting example, 500 μl of 0.12 M $Na_2CO_3$ aqueous solution (or, 500 μl of 0.18 M or 0.06 M $Na_2CO_3$ aqueous solutions) was added into an ethanol solution, containing 10 ml of absolute ethanol and 2 ml of diethanolamine (DEA), under vigorous stirring. Upon addition of $Na_2CO_3$, the ethanol solution immediately became mild cloudy, indicating the formation of $Na_2CO_3$ nanoparticles. Dynamic light scattering (DLS) measurement showed that the size of the nanoparticles generally ranged from 30-110 nm, with a D50 (median diameter) value of around 60 nm. Unless otherwise specified, sizes or diameters of nanoparticles mentioned herein are obtained from DLS. The as-prepared nanoparticles are stable for more than 12 h without apparent size change. In contrast, injection of 500 μl of 0.12 M $Na_2CO_3$ aqueous solution directly into 10 ml of absolute ethanol, in the absence of DEA, only resulted in particles in micron-scale or bulk precipitates (FIG. 1).

Figure 4:
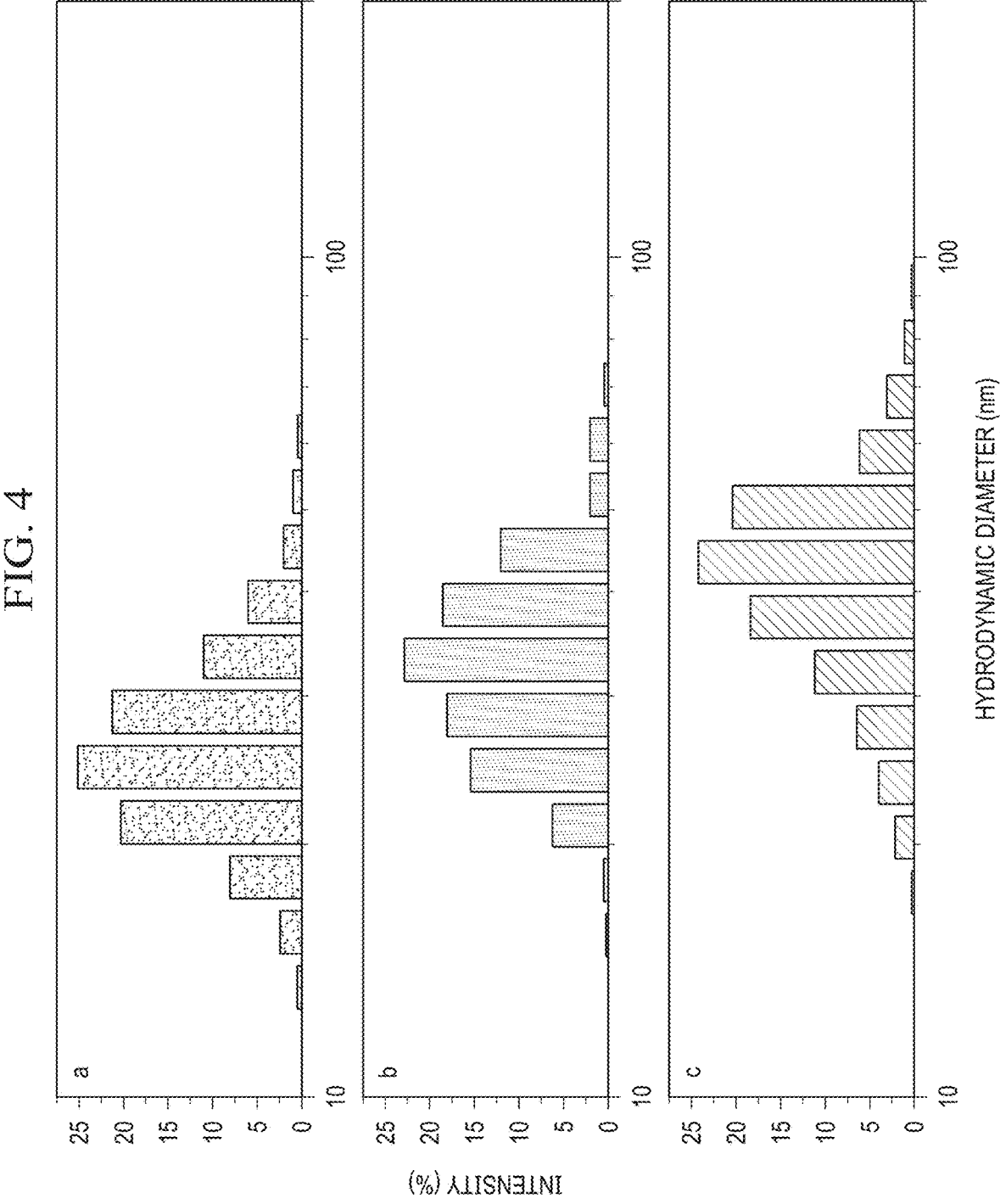
FIG. 4 shows how hydrodynamic size distribution of sodium carbonate nanoparticles, prepared in the presence of diethanolamine, increases with increasing amounts of sodium carbonate. D50 and D90 are 23.4 nm and 33.0 nm (A), 31.8 nm and 45.2 nm (B), and 42.3 nm and 51.6 nm (C), respectively.

The size distribution of $Na_2CO_3$ nanoparticles prepared by the above approach can be "tuned" by adjusting the overall mass of $Na_2CO_3$ and/or the volume of DEA in the aqueous solution. Generally, the average size of the nanoparticles increases as the amount of $Na_2CO_3$ increases (FIGS. 4A-C) and decreases as the amount of DEA increases.

In various non-limiting embodiments of the present disclosure, alkanolamines with primary, secondary, and tertiary amines function to stabilize the salt nanoparticles that are prepared through the above precipitation approach. Alkanolamines are molecules that contain both hydroxyl and amine groups. The number of hydroxyl groups in alkanolamines generally falls within the range of 1-8. Examples of alkanolamines that may be used in the methods of the present disclosure include but are not limited to monomethanolamine (MMA), dimethanolamine (DMA), trimethanolamine (TMA), monoethanolamine (MEA), diethanolamine (DEA), triethanolamine (TEA), hydroxyethanolamine (HEA), monopropanolamine (MPA), isopropanolamine (IPA), as well as alkylated alkanolamines, such as but not limited to methylmonoethanolamine (MMEA), ethylmonoethanolamine (EMEA), propylmonoethanolamine (PMEA), butylmonoethanolamine (B MEA), methyldiethanolamine (MDEA), ethyldiethanolamine (EDEA), propyldiethanolamine (PDEA), butyldiethanolamine (B DEA), dimethylmethanolamine (DMMA), diethylmethanolamine (DEMA), dipropylmethanolamine (DPMA), diisopropylmethanolamine (DIPMA), dibutylmethanolamine (DBMA), dimethylethanolamine (DMEA), diethylethanolamine (DEEA), dipropylethanolamine (DPEA), and diisopropanolamine (DIPA), and dibutylethanolamine (DBEA).

Examples of salts that can be used to form the nanoparticle templates of the present disclosure include but are not limited to salts which possess the feature that they can be easily dissolved by water-based solvents, such as pure water, basic or acidic water, or water with other miscible solvents, where water is a major component. Examples of such salts include but are not limited to sodium, potassium and ammonium chloride, sodium, potassium and ammonium sulfate, sodium, potassium and ammonium hydrogen sulfate, sodium, potassium and ammonium sulfite, sodium, potassium and ammonium hydrogen sulfite, sodium, potassium and ammonium carbonate, sodium, potassium and ammonium hydrogen carbonate, calcium carbonate, monosodium, monopotassium and monoammonium phosphate, disodium, dipotassium and diammonium phosphate, trisodium, tripotassium and triammonium phosphate, as well as sodium, potassium and ammonium salts of organic mono-, di-, tri-, oligo- and poly-acids of carboxylic acid and sulfonic acid, including but not limited to, acetic acid, benzoic acid, oxalic acid, malonic acid, succinic acid, glutaric acid, adipic acid, tricarballylic acid, citric acid, benzenetricarboxylic acids, polyacrylic acids, polymethacrylic acid, methanesulfonic acid, benzene sulfonic acid, ethanedisulfonic acid, propanedisulfonic acids, butanedisulfonic acids, benzene disulfonic acid, benzene trisulfonic acid, poly(vinylsulfonic acid), and poly(4-styrenesulfonic acid). Additionally, acids having various formats of salts, such as monobasic, dibasic, and tribasic, etc., pure or mixed form of cations of sodium, potassium, ammonium or other suitable cations may be used for the preparation of the salt nanoparticles. Additionally, salts that are produced through reaction of acids with bases during any stage of the salt nanoparticles preparation are also included in this disclosure.

Examples of such water-miscible solvents include but are not limited to, alcohols such as methanol, ethanol, n-propanol, isopropanol, tert-butanol, and organic solvents such as acetone, tetrahydrofuran (THF), dimethyl sulfoxide (DMSO), acetonitrile, 1,4-dioxane, acetic acid, acetaldehyde, 1,2-Butanediol, 1,3-Butanediol, 1,4-Butanediol, 2-butoxyethanol, butyric acid, diethanolamine (DEA), diethylenetriamine, dimethylformamide, ethylamine, ethylene glycol, formic acid, furfuryl alcohol, glycerol, methyldiethanolamine (MDEA), methyl isocyanide, N-methyl-2-pyrrolidone, 1,3-Propanediol, 1,5-Pentanediol, propanoic acid, propylene glycol, pyridine, and triethylene glycol.

The precursor compound used herein may be selected from, for example, silanes (including orthosilicic acid esters), titanium chloride, titanium alkoxides such as titanium isopropoxide and titanium butoxide, zinc chloride, zinc acetate, zinc nitrate, and polydopamine, polypyrrole, and polyaniline obtained from polymerization of the monomers, dopamine, pyrrole, and aniline, respectively.

Silanes used in various embodiments of the present disclosure may be selected from, for example, alkoxysilanes, including but not limited to (i) tetraalkoxysilanes, including but not limited to, tetraethoxysilane (TEOS), tetramethoxysilane (TMOS), tetrapropoxysilane (TPOS), and tetrabutoxysilane (TB OS); (ii) alkyltrialkoxysilanes, including but not limited to, methyltrimethoxysilane, methyltriethoxysilane, methyltripropoxysilane, and methyltributoxysilane; (iii) dialkyldialkoxysilanes, including but not limited to, dimethyldimethoxysilane, dimethyldiethoxysilane, dimethyldipropoxysilane, and dimethyldibutoxysilane; (iiii) trialkylalkoxysilanes, including but not limited to, trimethylmethoxysilane, trimethylethoxysilane, trimethylpropoxysilane, and trimethylbutoxysilane; and (v) various other alkoxysilanes including, but not limited to, vinyltrimethoxysilane, vinyltriethoxysilane, 2-(3,4-epoxycyclohexyl)ethyltrimethoxysilane, (3-glycidoxypropyl)trimethoxysilane, (3-glycidoxypropyl)triethoxysilane, (3-glycidoxypropyl)methyldimethoxysilane, (3-glycidoxypropyl)methyldiethoxysilane, (3-chloropropyl)methyldimethoxysilane, (3-chloropropyl)trimethoxysilane, p-styryltrimethoxysilane, (3-mercaptopropyl)trimethoxysilane, (3-mercaptopropyl)methyldimethoxysilane, 3-(2-aminoethylamino)propyltrimethoxysilane, 3-(2-aminoethylamino)propyltriethoxysilane, (3-aminopropyl)trimethoxysilane, (3-aminopropyl)trimethoxysilane, (3-aminopropyl)triethoxysilane, 3-triethoxy silyl-N-(1,3-dimethyl-butylidene)propylamine, N-phenyl-3-aminopropyltrimethoxysilane, (3-isocyanatopropyl)triethoxysilane, hexyltrimethoxysilane, hexyltriethoxysilane, octyltrimethoxysilane, octyltriethoxysilane, decyltrimethoxysilane, decyltriethoxysilane, trifluoropropyltrimethoxysilane, phenyltrimethoxysilane, phenyltriethoxysilane, diphenyldimethoxysilane, diphenyldiethoxysilane, (3-methacryloxypropyl)methyldimethoxysilane, (3-methacryloxypropyl)trimethoxysilane, (3-methacryloxypropyl)methyldiethoxysilane, (3-methacryloxypropyl)triethoxysilane, (3-acryloxypropyl)trimethoxysilane, and (3-acryloxypropyl)methyldimethoxysilane.

Other silane compounds which may be used in the methods of the present disclosure include, but are not limited to, chlorosilane compounds such as methyltrichlorosilane, dimethyldichlorosilane, trimethylchlorosilane, vinyltrichlorosilane, methylvinyldichlorosilane, phenyltrichlorosilane, diphenyldichlorosilane, and methyldiphenylchlorosilane, and fluoro, bromo, and iodo versions of the above chloro compounds. Acyloxysilane compounds which may be used in the methods of the present disclosure include, but are not limited to, tetraacetoxysilane, methyltriacetoxysilane, phenyltriacetoxysilane, dimethyldiacetoxysilane, diphenyldiacetoxysilane, and trimethylacetoxysilane. Silazane compounds which may be used in the methods of the present disclosure include, but are not limited to, hexamethyldisilazane. Silanol compounds which may be used in the methods of the present disclosure include, but are not limited to, dimethylsilanediol, diphenylsilanediol, and trimethylsilanol.

In addition to precipitation of nanoparticles through reduced solubility in different solvents, salts which may be made to form the templates of the present disclosure include compounds that precipitate out in their corresponding pure or mixed non-solvent through chemical reactions, such as precipitation formed in water or alcohols between calcium and carbonate ions, calcium and sulfate ions, magnesium and carbonate ions, magnesium and sulfate ions, etc.

The approach of preparation may also include dissolving the highly water-soluble salts into a solvent having a polarity similar to that of water, such as methanol, ethanol, diols and triols, wherein precipitation of salt is achieved, in the presence of alkanolamines, by adding the solution into a miscible solvent in which the salts barely dissolve.

In various embodiments, the various steps of the disclosed processes can occur in different sequences. Various sequences of combination water, the salt, the solvent, and the alkanolamine may occur to produce the claimed compositions. Different ways of mixing components, for example, adding salt solution to the alkanolamines/solvent mixture or vice versa, or adding salt solutions and alkanolamines simultaneously into solvent, or adding alkanolamines and solvent simultaneously into salt solution may occur. The components may be prepared using various mixing methods, such as stirring, fluidic/microfluidic devices, homogenizers, and ultrasound. In certain embodiments of the present disclosure wherein the salt templates do not include silica coatings, silica precursors are not necessary.

Figure 5:
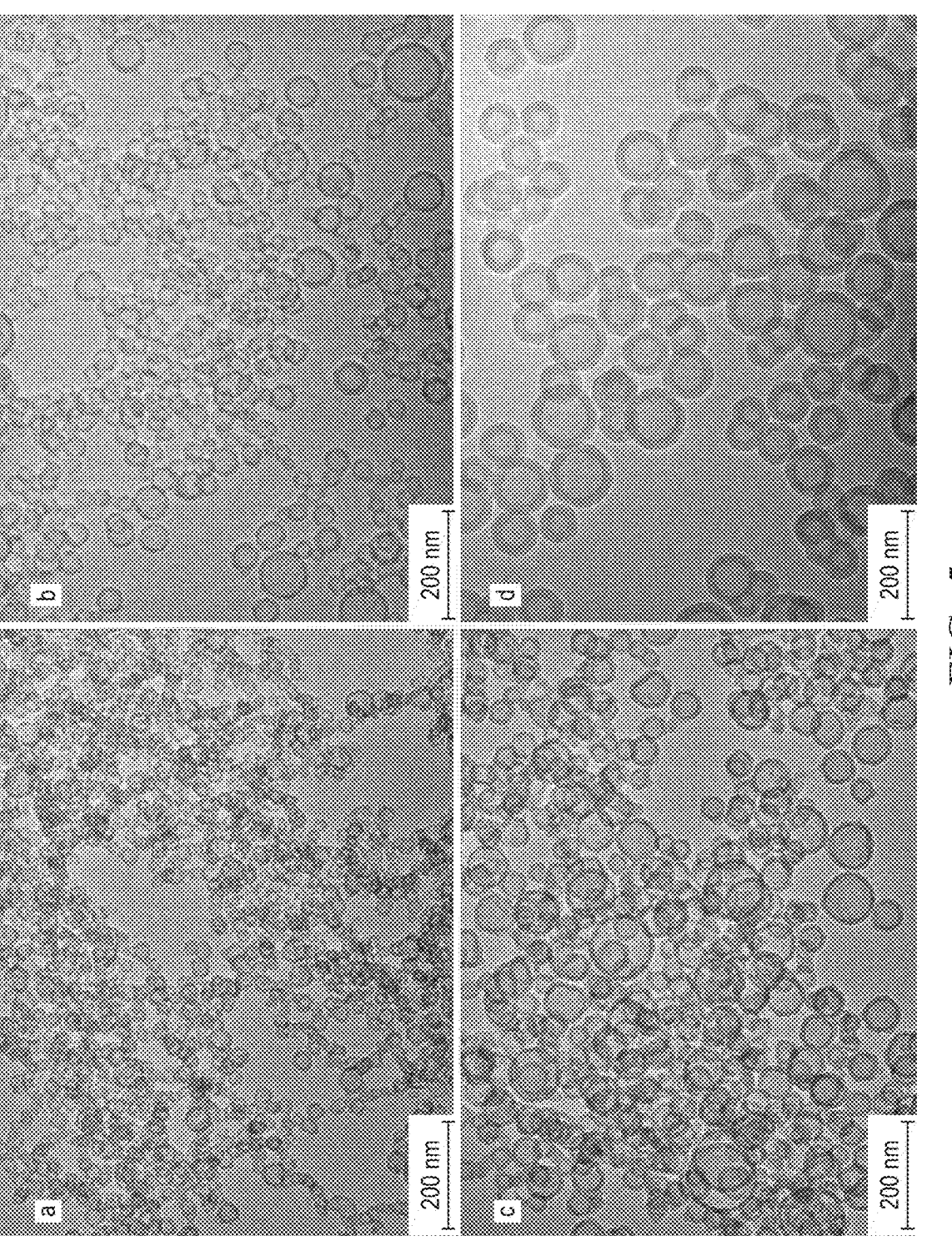
FIG. 5 shows micrograph images of hollow silica nanoparticles that are fabricated by using sodium carbonate nanoparticles as templates. By using salt templates of different size distributions, the diameters of the hollow silica nanoparticles produced from those templates will change (A-D). The thickness of the nanoparticle wall ("shell thickness") can be controlled by adjusting the amount of the silica precursor that is supplied. Shell thicknesses in the nanoparticles of A-C are approximately 10 nm and of D are approximately 22 nm.
Figure 6:
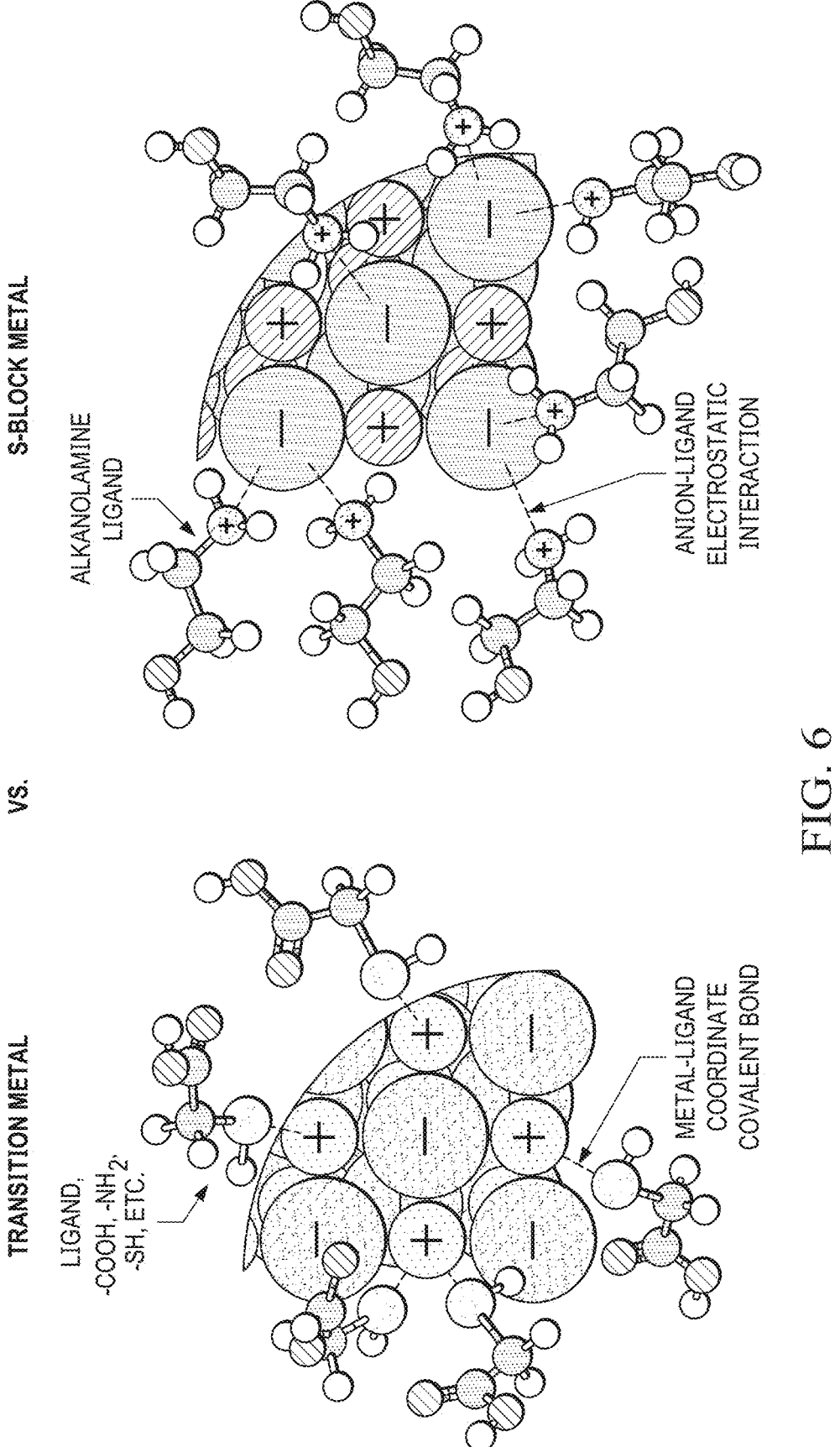
FIG. 6 shows the mechanism of salt nanoparticles stabilization through alkanolamine ligands. Conventional ligands theory was developed for transition metals, where ligands interact with the metal centers in nanoparticles through covalent bonding. Such a covalent bonding interaction is not available for the s-block metal centers in the water-soluble salts to be selected for salt nanoparticles preparation. In this invention, the alkanolamine ligands function through electrostatic interaction with the anions to achieve stabilization of salt nanoparticles.

In certain non-limiting embodiments, silica was used to demonstrate that the salt nanoparticles prepared by the above approach can be used as templates for preparing hollow nanoparticles. In a non-limiting example, 500 µl of 0.12 M $Na_2CO_3$ aqueous solution (solution A) was added to an ethanol solution (solution B), containing 10 ml of absolute ethanol and 2 ml of diethanolamine (DEA), under vigorous stirring. Following the formation of $Na_2CO_3$ nanoparticles, 100 µl of tetraethyl orthosilicate (TEOS), also referred to herein as tetraethoxysilane, was injected into the above solution. After stirring for a few hours, $Na_2CO_3$/silica core/shell nanoparticles can be obtained. The $Na_2CO_3$ in the core can be readily washed away by water to generate hollow silica nanoparticles of around 10 nm shell thickness. The size distribution of hollow silica nanoparticles changes correspondingly with that of the salt templates (FIG. 5A-C). The shell thickness of the hollow silica nanoparticles can be tuned facilely by the supply of TEOS (FIG. 5D). Formation of hollow silica nanoparticles is universal regardless of the chemical composite of the salt nanoparticle's templates or the type of alkanolamines that stabilize the salt nanoparticles. TEOS is described herein in the methods of forming the hollow nanoparticles but any orthosilicic acid ester compound, particularly alkoxy orthosilicates (alkoxysilanes, including alkylalkoxysilanes), that function in accordance with the present disclosure may be used, including, but not limited to tetramethoxysilane (TMOS), tetrapropoxysilane (TPOS), and tetrabutoxysilane (TBOS), as noted above.

In addition to producing hollow silica nanoparticles as described herein, various other types of hollow nanoparticles can be prepared using the methods of the present disclosure by substituting the silane precursor compound with a different precursor compound from which the shell of the hollow nanoparticle is desired to be formed. Examples of other hollow nanoparticles that can be formed using the methodology disclosed herein (using different precursor compounds) include but are not limited to hollow nanoparticles of titanium dioxide, hollow nanoparticles of zinc oxide, hollow nanoparticles of polydopamine, hollow nanoparticles of polypyrrole, hollow nanoparticles of polyaniline, and hollow nanoparticles of carbon. For example, precursors for hollow titanium dioxide nanoparticles include but are not limited to titanium chloride, titanium alkoxides, such as titanium isopropoxide, titanium butoxide, through hydrolysis of which titanium oxide will be produced. Precursors for hollow zinc oxide nanoparticles include but are not limited to zinc chloride, zinc acetate, zinc nitrate, which will form insoluble hydroxides and oxides in basic conditions. Polydopamine, polypyrrole, and polyaniline can be obtained from polymerization of their corresponding monomers, i.e. dopamine, pyrrole, and aniline, respectively, in the presence of catalysts. Hollow carbon nanoparticles can be obtained through carbonization of the hollow polymer nanoparticles of, for example, polydopamine, polypyrrole or polyaniline, under high temperature.

The novel technology disclosed herein enables scalable production of optical quality hollow nanoparticles, such as hollow silica nanoparticles, that have sizes under 100 nm and wall thicknesses as small as 5 nm. Currently, silica nanoparticles of this quality cannot be manufactured by other reported methods in a scalable and cost-effective manner.

Hollow silica nanoparticles made using the methods of the present disclosure can have the following non-limiting uses: (1) as nanoparticles, for retail marketing or for serving in R&D purposes, (2) as a key enabling component in a mixture of hollow silica nanoparticles and resin precursors for anti-reflective thin film coatings, (3) as a key enabling component for various thermal insulation applications in microelectronics or fabrics, etc., (4) with surface modification for use as drug carriers for drug delivery, and (5) as an additive for beauty products.

Currently, there have been no hollow silica nanoparticles of this quality commercially available. Worldwide, there is only one manufacturer (in Japan) of this product, and it is available only through business-to-business channel. The hollow nanoparticle product described herein is manufactured by a much simpler and cleaner novel protocol. The precursors used herein for fabrication are completely non-toxic, therefore, the hollow silica nanoparticles can be readily used for biomedical applications.

The conventional technology for anti-reflective coating is finished by physical vapor deposition method, which not only requires very costly equipment, but also not suitable for large-area processing. Another alternative approach is achieved by creating porous thin films through wet-coating approach, which can produce anti-reflective coatings very cost effectively in large scale. However, the open-pore structure will trap dirt particles or small organic molecules over the course of use, especially during frequent contact with human fingers, which lead to reduced transparency and loss of anti-reflective features. In contrast, the hollow silica nanoparticles have closed cavities, which refuse the entry of dirt particles or organic molecules into their hollow structures. Therefore, hollow silica nanoparticles enable cost-effective, large scale production of durable and highly effective anti-reflective coatings through wet thin film coating approach.

In conclusion, in at least one non-limiting embodiment, the present disclosure is directed to making a template for use in forming hollow nanoparticles, comprising the steps of: (1) providing an aqueous solution comprising a salt; (2) providing a solvent solution comprising a solvent and an alkanolamine, wherein the solvent is water-miscible, and wherein the salt is less soluble in the solvent than in water; (3) combining the aqueous solution with the solvent solution forming a solvent mixture, the solvent mixture comprising salt core nanoparticles formed from precipitation of the salt; (4) adding a precursor compound to the solvent mixture, wherein the precursor compound undergoes a chemical reaction to form insoluble outer shells over the salt core nanoparticles, thereby forming core/shell nanoparticles which may be used to produce the hollow nanoparticles by exposing the core/shell nanoparticles to a salt-dissolving solvent wherein the salt cores of the core/shell nanoparticles dissolve to leave the hollow nanoparticles which substantially comprise only the shells of the core/shell nanoparticles. In at least one embodiment, the present disclosure is directed to the core/shell nanoparticles made by this method.

Additionally, in at least one non-limiting embodiment, the present disclosure is directed to a method of forming hollow nanoparticles, comprising the steps of: (1) providing an aqueous solution comprising a salt; (2) providing a solvent solution comprising a solvent and an alkanolamine, wherein the solvent is water-miscible, and wherein the salt is less soluble in the solvent than in water; (3) combining the aqueous solution with the solvent solution forming a solvent mixture, the solvent mixture comprising salt core nanoparticles formed from precipitation of the salt; (4) adding a precursor compound to the solvent mixture, wherein the precursor compound is catalyzed by the alkanolamine to form insoluble outer shells over the salt core nanoparticles, thereby forming core/shell nanoparticles; and (5) producing the hollow nanoparticles by exposing the core/shell nanoparticles to a salt-dissolving solvent thereby causing dissolution of the salt cores of the core/shell nanoparticles, wherein the hollow nanoparticles substantially comprise only the shells of the core/shell nanoparticles. In at least one embodiment, the present disclosure is directed to the hollow nanoparticles made by this method.

In the above methods, the alkanolamine may be selected from, for example, monomethanolamine (MMA), dimethanolamine (DMA), trimethanolamine (TMA), monoethanolamine (MEA), diethanolamine (DEA), triethanolamine (TEA), hydroxyethanolamine (HEA), monopropanolamine (MPA), isopropanolamine (IPA), as well as alkylated alkanolamines, such as but not limited to methylmonoethanolamine (MMEA), ethylmonoethanolamine (EMEA), propylmonoethanolamine (PMEA), butylmonoethanolamine (B MEA), methyldiethanolamine (MDEA), ethyldiethanolamine (EDEA), propyldiethanolamine (PDEA), butyldiethanolamine (BDEA), dimethylmethanolamine (DMMA), diethylmethanolamine (DEMA), dipropylmethanolamine (DPMA), diisopropylmethanolamine (DIPMA), dibutylmethanolamine (DBMA), dimethylethanolamine (DMEA), diethylethanolamine (DEEA), dipropylethanolamine (DPEA), and diisopropanolamine (DIPA), and dibutylethanolamine (DBEA).

In the above methods, the salt may be selected from, for example, sodium, potassium and ammonium chloride, sodium, potassium and ammonium sulfate, sodium, potassium and ammonium hydrogen sulfate, sodium, potassium and ammonium sulfite, sodium, potassium and ammonium hydrogen sulfite, sodium, potassium and ammonium carbonate, sodium, potassium and ammonium hydrogen carbonate, monosodium, calcium carbonate, monopotassium and monoammonium phosphate, disodium, dipotassium and diammonium phosphate, trisodium, tripotassium and triammonium phosphate, and sodium, potassium and ammonium salts of organic mono-, di-, tri-, oligo- and poly-acids of carboxylic acid and sulfonic acid.

In the above methods, the organic mono-, di-, tri-, oligo- and poly-acids of carboxylic acid and sulfonic acid may be selected from, for example, acetic acid, benzoic acid, oxalic acid, malonic acid, succinic acid, glutaric acid, adipic acid, tricarballylic acid, citric acid, benzenetricarboxylic acids, polyacrylic acids, polymethacrylic acid, methanesulfonic acid, benzene sulfonic acid, ethanedisulfonic acid, propanedisulfonic acids, butanedisulfonic acids, benzene disulfonic acid, benzene trisulfonic acid, poly(vinylsulfonic acid), and poly(4-styrenesulfonic acid).

In the above methods, the water-miscible solvent may be selected from, for example, alcohols such as methanol, ethanol, n-propanol, isopropanol, and tert-butanol, and organic solvents such as acetone, tetrahydrofuran (THF), dimethyl sulfoxide (DMSO), acetonitrile, 1,4-dioxane, acetic acid, acetaldehyde, 1,2-Butanediol, 1,3-Butanediol, 1,4-Butanediol, 2-butoxyethanol, butyric acid, diethanolamine (DEA), diethylenetriamine, dimethylformamide, ethylamine, ethylene glycol, formic acid, furfuryl alcohol, glycerol, methyldiethanolamine (MDEA), methyl isocyanide, N-methyl-2-pyrrolidone, 1,3-Propanediol, 1,5-Pentanediol, propanoic acid, propylene glycol, pyridine, and triethylene glycol.

In the above methods, the salt-dissolving solvent may be a water-based solvent, such as pure water, basic water, or acidic water, or an acid.

In the above methods, the precursor compound used herein may be selected from, for example, silanes (including orthosilicic acid esters), titanium chloride, titanium alkoxides such as titanium isopropoxide and titanium butoxide, zinc chloride, zinc acetate, zinc nitrate, and polydopamine, polypyrrole, and polyaniline obtained from polymerization of the monomers, dopamine, pyrrole, and aniline, respectively.

In the above methods, the silanes used in various embodiments of the present disclosure may be selected from, for example, alkoxysilanes, including but not limited to (i) tetraalkoxysilanes, including but not limited to, tetraethoxysilane (TEOS), tetramethoxysilane (TMOS), tetrapropoxysilane (TPOS), and tetrabutoxysilane (TB OS); (ii) alkyltrialkoxysilanes, including but not limited to, methyltrimethoxysilane, methyltriethoxysilane, methyltripropoxysilane, and methyltributoxysilane; (iii) dialkyldialkoxysilanes, including but not limited to, dimethyldimethoxysilane, dimethyldiethoxysilane, dimethyldipropoxysilane, and dimethyldibutoxysilane; (iiii) trialkylalkoxysilanes, including but not limited to, trimethylmethoxysilane, trimethylethoxysilane, trimethylpropoxysilane, and trimethylbutoxysilane; and (v) various other alkoxysilanes including, but not limited to, vinyltrimethoxysilane, vinyltriethoxysilane, 2-(3,4-epoxycyclohexyl)ethyltrimethoxysilane, (3-glycidoxypropyl)trimethoxysilane, (3-glycidoxypropyl)triethoxysilane, (3-glycidoxypropyl)methyldimethoxysilane, (3-glycidoxypropyl)methyldiethoxysilane, (3-chloropropyl)methyldimethoxysilane, (3-chloropropyl)trimethoxysilane, p-styryltrimethoxysilane, (3-mercaptopropyl)trimethoxysilane, (3-mercaptopropyl)methyldimethoxysilane, 3-(2-aminoethylamino)propyltrimethoxysilane, 3-(2-aminoethylamino)propyltriethoxysilane, (3-aminopropyl)trimethoxysilane, (3-aminopropyl)trimethoxysilane, (3-aminopropyl)triethoxysilane, 3-triethoxy silyl-N-(1,3-dimethyl-butylidene)propylamine, N-phenyl-3-aminopropyltrimethoxysilane, (3-isocyanatopropyl)triethoxysilane, hexyltrimethoxysilane, hexyltriethoxysilane, octyltrimethoxysilane, octyltriethoxysilane, decyltrimethoxysilane, decyltriethoxysilane, trifluoropropyltrimethoxysilane, phenyltrimethoxysilane, phenyltriethoxysilane, diphenyldimethoxysilane, diphenyldiethoxysilane, (3-methacryloxypropyl)methyldimethoxysilane, (3-methacryloxypropyl)trimethoxysilane, (3-methacryloxypropyl)methyldiethoxysilane, (3-methacryloxypropyl)triethoxysilane, (3-acryloxypropyl)trimethoxysilane, and (3-acryloxypropyl)methyldimethoxysilane.

In the above methods, other silane compounds which may be used include, but are not limited to, chlorosilane compounds such as methyltrichlorosilane, dimethyldichlorosilane, trimethylchlorosilane, vinyltrichlorosilane, methylvinyldichlorosilane, phenyltrichlorosilane, diphenyldichlorosilane, and methyldiphenylchlorosilane, and fluoro, bromo, and iodo versions of the above chloro compounds. Acyloxysilane compounds which may be used in the methods of the present disclosure include, but are not limited to, tetraacetoxysilane, methyltriacetoxysilane, phenyltriacetoxysilane, dimethyldiacetoxysilane, diphenyldiacetoxysilane, and trimethylacetoxysilane. Silazane compounds which may be used in the methods of the present disclosure include, but are not limited to, hexamethyldisilazane. Silanol compounds which may be used in the methods of the present disclosure include, but are not limited to, dimethylsilanediol, diphenylsilanediol, and trimethylsilanol.

What is claimed is:

1. A method for making a template for use in forming hollow nanoparticles, the method comprising:

providing an aqueous solution comprising a salt;

providing a solvent solution comprising a solvent and an alkanolamine;

combining the aqueous solution with the solvent solution forming a solvent mixture, the solvent mixture comprising salt core nanoparticles formed from precipitation of the salt; and adding a precursor compound to the solvent mixture, wherein the precursor compound and the alkanolamine interact electrostatically to form insoluble outer shells over the salt core nanoparticles, thereby forming core/shell nanoparticles.

2. The method of claim 1, further comprising exposing the core/shell nanoparticles to a salt-dissolving solvent to produce the hollow nanoparticles.

3. The method of claim 2, wherein the hollow nanoparticles comprise only shells of the core/shell nanoparticles.

4. The method of claim 1, wherein the solvent is water-miscible.

5. The method of claim 1, wherein the salt is less soluble in the solvent than in water.

6. The method of claim 1, wherein the alkanolamine is selected from the group consisting of monomethanolamine (MMA), dimethanolamine (DMA), trimethanolamine (TMA), monoethanolamine (MEA), diethanolamine (DEA), triethanolamine (TEA), hydroxyethanolamine (HEA), monopropanolamine (MPA), isopropanolamine (IPA), and an alkylated alkanolamine.

7. The method of claim 1, wherein the salt is selected from the group consisting of sodium, potassium and ammonium chloride, sodium, potassium and ammonium sulfate, sodium, potassium and ammonium hydrogen sulfate, sodium, potassium and ammonium sulfite, sodium, potassium and ammonium hydrogen sulfite, sodium, potassium and ammonium carbonate, sodium, potassium and ammonium hydrogen carbonate, monosodium, calcium carbonate, monopotassium and monoammonium phosphate, disodium, dipotassium and diammonium phosphate, trisodium, tripotassium and triammonium phosphate, and sodium, potassium and ammonium salts of organic mono-, di-, tri-, oligo- and poly-acids of carboxylic acid and sulfonic acid.

8. The method of claim 7, wherein the salt is an organic mono-, di-, tri-, oligo- and poly-acids of carboxylic acid and sulfonic acid selected from the group consisting of acetic acid, benzoic acid, oxalic acid, malonic acid, succinic acid, glutaric acid, adipic acid, tricarballylic acid, citric acid, benzenetricarboxylic acids, polyacrylic acids, polymethacrylic acid, methanesulfonic acid, benzene sulfonic acid, ethanedisulfonic acid, propanedisulfonic acids, butanedisulfonic acids, benzene disulfonic acid, benzene trisulfonic acid, poly(vinylsulfonic acid), and poly(4-styrenesulfonic acid).

9. The method of claim 1, wherein the precursor compound is selected from the group consisting of silanes, orthosilicic acid esters, titanium chloride, titanium alkoxides, zinc chloride, zinc acetate, zinc nitrate, polydopamine, polypyrrole, and polyaniline.

10. The method of claim 6, wherein the alkylated alkanolamine is selected from the group consisting of methylmonoethanolamine (MMEA), ethylmonoethanolamine (EMEA), propylmonoethanolamine (PMEA), butylmonoethanolamine (BMEA), methyldiethanolamine (MDEA), ethyldiethanolamine (EDEA), propyldiethanolamine (PDEA), butyldiethanolamine (BDEA), dimethylmethanolamine (DMMA), diethylmethanolamine (DEMA), dipropylmethanolamine (DPMA), diisopropylmethanolamine (DIPMA), dibutylmethanolamine (DBMA), dimethylethanolamine (DMEA), diethylethanolamine (DEEA), dipropylethanolamine (DPEA), and diisopropanolamine (DIPA), and dibutylethanolamine (DBEA).

11. The method of claim 9, wherein the titanium alkoxide is at least one of titanium isopropoxide and titanium butoxide.

* * * * *